United States Patent
Lee

(10) Patent No.: US 8,058,883 B2
(45) Date of Patent: Nov. 15, 2011

(54) METHOD AND APPARATUS FOR DETECTING CAPACITANCE USING A PLURALITY OF TIME DIVISION FREQUENCIES

(75) Inventor: Sang-Chuel Lee, Anyang-si (KR)

(73) Assignee: AD Semiconductor Co., Ltd., Seoul (KR)

( * ) Notice: Subject to any disclaimer, the term of this patent is extended or adjusted under 35 U.S.C. 154(b) by 291 days.

(21) Appl. No.: 12/309,407

(22) PCT Filed: Mar. 14, 2007

(86) PCT No.: PCT/KR2007/001262
§ 371 (c)(1),
(2), (4) Date: Jan. 16, 2009

(87) PCT Pub. No.: WO2008/010634
PCT Pub. Date: Jan. 24, 2008

(65) Prior Publication Data
US 2009/0302871 A1    Dec. 10, 2009

(30) Foreign Application Priority Data
Jul. 20, 2006 (KR) .................. 10-2006-0067965

(51) Int. Cl.
*G01R 27/26* (2006.01)
(52) U.S. Cl. .................. 324/674; 324/681
(58) Field of Classification Search .................. 324/674, 324/681
See application file for complete search history.

(56) References Cited

U.S. PATENT DOCUMENTS

| | | | |
|---|---|---|---|
| 5,296,374 A | 3/1994 | Culshaw et al. | 435/287.9 |
| 5,726,567 A | 3/1998 | Lewis et al. | 324/207.16 |
| 6,326,795 B1 | 12/2001 | Matsumoto et al. | |
| 7,091,727 B2 | 8/2006 | Lee | |
| 7,138,809 B2 | 11/2006 | Nakamura et al. | 324/681 |
| 2006/0055417 A1 | 3/2006 | Lee | |

FOREIGN PATENT DOCUMENTS

| | | |
|---|---|---|
| EP | 0 303 442 A2 | 2/1989 |
| JP | A-9-89943 | 4/1997 |
| KR | 10-2006-0021202 | 3/2006 |

*Primary Examiner* — Jeff Natalin
(74) *Attorney, Agent, or Firm* — Oliff & Berridge, PLC

(57) ABSTRACT

Disclosed herein is a method for detecting capacitance including: allowing an oscillator to output a plurality of time division oscillation frequencies according to the capacitance detected by a capacitance detection plate; counting the plurality of time division oscillation frequencies during a predetermined time period; and offsetting increasing and decreasing of the oscillation frequencies due to noise such that a count value becomes uniform over the predetermined time period. Even when external noise is applied, distortion of the oscillation frequency due to the external noise is minimized and the oscillation frequency varies depending on only the capacitance of the capacitance detection plate. Accordingly, it is possible to prevent an error due to the noise at the time of the detection of the capacitance.

2 Claims, 11 Drawing Sheets

(a)

(b)

(a)

(b)

METHOD AND APPARATUS FOR DETECTING CAPACITANCE USING A PLURALITY OF TIME DIVISION FREQUENCIES

TECHNICAL FIELD

The present invention relates to a method and apparatus for detecting capacitance, and more particularly, to a method and apparatus for detecting capacitance using a plurality of time division frequencies.

BACKGROUND ART

When an object (for example, a finger of a person) approaches or contacts a capacitance detection plate, an apparatus for detecting capacitance detects a variation in capacitance between the capacitance detection plate and the object and generates a switching signal according to the result of detection. Such a variation in capacitance is detected by an oscillation frequency. That is, when the object approaches the capacitance detection plate, the variation in capacitance between the object and the detection plate occurs and the oscillation frequency of an oscillator varies depending on the capacitance of the detection plate. The oscillation frequency is counted by a frequency counter and compared with a predetermined reference count value and the switching signal according to the contact or the approach of the object is generated.

However, a variation speed of the oscillation frequency of the oscillator varies depending on external wireless noise which is unexpectedly applied, in addition to the variation in capacitance caused by the object which approaches the detection plate. In addition, the oscillation frequency of the oscillator varies even when external electric noise is suddenly applied to a power supply line connected to the oscillator.

FIGS. 1 to 4 are views illustrating a conventional single triangle wave oscillator.

FIG. 1 shows a circuit for generating reference current Is, which is determined by a resistor R.

FIG. 2 shows a circuit for determining a direction charge/discharge current. When a voltage charged in a capacitor Cx is larger than Vref+, a discharge is continuously performed until the voltage reaches Vref−, and, when the voltage reaches the Vref−, a charge is performed. The charge and discharge are repeated so that oscillation occurs. The capacitor Cx indicates a capacitor formed in the capacitance detection plate.

FIG. 3 shows a voltage waveform charged/discharged to/from the capacitor Cx of FIG. 2 and a charge/discharge signal which passes through voltage comparators U1A and U2A and a flip-flop FF. The charge/discharge voltage waveform has a triangular shape and the charge/discharge signal has a rectangular shape. The oscillation frequency varies depending on the reference current Is, the charge and discharge reference voltages Vref+ and Vref−, the delay of the charge/discharge switch FF and the value of the capacitor Cx of the detection plate.

FIG. 4 is a circuit diagram showing an output terminal of an oscillator. When the reference current Is and the charge signal (high voltage) are input, a transistor M9 is turned on such that the reference current Is outputs to a current output port. When the discharge signal (low voltage) is input, the transistor M9 is turned off and a transistor M11 is turned on such that the reference current Is is discharged to earth through the current output port.

The oscillation frequency of the oscillator is approximately defined to Is/(2*Vth*Cx). Here, Vth is (Vref+−Vref−)/2. Accordingly, the oscillator is generally designed such that the oscillation frequency varies depending on the value of the capacitor Cx. However, when the capacitance detection plate is influenced by strong external noise, the oscillation frequency follows the frequency of the external noise due to the external noise.

FIG. 5 shows a model in which external noise is applied to the capacitor Cx of the capacitance detection plate. The external noise is determined by a virtual parasitic capacitor Cp and the intensity of noise V1.

FIG. 6 is a graph showing a phenomenon that the oscillation frequency of the oscillator is distorted by the external noise Cp and V1 when the oscillation frequency is 33 MHz and the external noise is applied through the capacitor Cp in a sine form while varying in a range from 1 MHz to 63 MHz.

As shown in FIG. 6, the distortion of the oscillation frequency significantly decreases when the frequency of the external noise is distant from 33 MHz and increases when the frequency of the external noise is close to 33 MHz. When the frequency of the external noise is very close to 33 MHz, the oscillation frequency follows the external noise component and then the distortion gradually decreases.

As described above, in the conventional single triangle wave oscillator, since the oscillation frequency significantly varies depending on the external noise, the oscillation frequency according to the variation in the capacitance Cx cannot be accurately obtained and an error occurs at the time of the detection of the capacitance.

Disclosure of the Invention

Therefore, the present invention has been made in view of the above problems, and it is an object of the present invention to provide a method and apparatus for detecting capacitance, which are capable of minimizing an error which occurs at the time of the detection of the capacitance by minimizing an oscillation frequency deviation due to external noise such that a variation in oscillation frequency is influenced by only a variation in capacitor component of a capacitance detection plate.

In accordance with an aspect of the present invention, the above and other objects can be accomplished by the provision of a method for detecting capacitance, comprising: allowing an oscillator to output a plurality of time division oscillation frequencies according to the capacitance detected by a capacitance detection plate; counting the plurality of time division oscillation frequencies during a predetermined time period; and offsetting increasing and decreasing of the oscillation frequencies due to noise such that a count value becomes uniform over the predetermined time period.

In accordance with another aspect of the present invention, there is provided an apparatus for detecting capacitance, comprising: a capacitance detection plate for detecting a variation in capacitance; an oscillator for oscillating a plurality of time division oscillation frequencies according to the capacitance of the capacitance detection plate; a frequency counter for counting a plurality of time division oscillation frequencies of the oscillator during a predetermined time period; and a comparison unit for calculating a frequency variation which is a difference between a count value of the frequency counter and a predetermined reference count value and outputting a detection signal when the frequency variation is larger than a predetermined detection level.

Advantageous Effect

As described above, according to the present invention, even when external noise is applied, distortion of the oscillation frequency due to the external noise is minimized and the oscillation frequency varies depending on only the capacitance of the capacitance detection plate. Accordingly, it is possible to prevent an error due to the noise at the time of the detection of the capacitance.

BRIEF DESCRIPTION OF THE DRAWINGS

The above and other objects, features and other advantages of the present invention will be more clearly understood from the following detailed description taken in conjunction with the accompanying drawings, in which:

FIG. 12a is a timing diagram of switch transistors MxS which are operated by time division switch on/off signal generators 21 and 22 shown in FIGS. 10 and 11;

FIG. 12b is a graph showing a variation in reference current Is according to the operation state shown in FIG. 12a.

BEST MODE FOR CARRYING OUT THE INVENTION

The present invention will now be described more fully with reference to the accompanying drawings, in which exemplary embodiments of the invention are shown. It is to be understood that the following embodiments are disclosed for illustrative purposes only. The present invention may be embodied in many different forms and should not be construed as being limited to the embodiments set forth herein.

Figure 7:
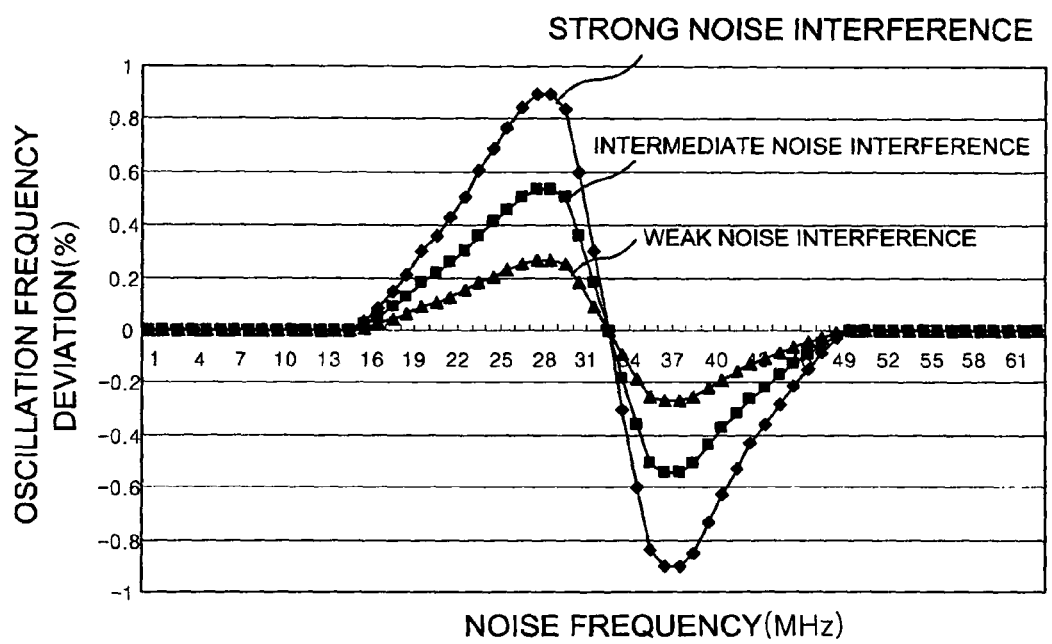
FIG. 7 is a graph illustrating a method for detecting capacitance according to the present invention.

FIG. 7 is a graph illustrating a method for detecting capacitance according to the present invention, when a plurality of time division triangle waves oscillate in a range of 1 MHz to 63 MHz and external noise of 33 MHz is applied.

As shown in FIG. 7, an oscillation frequency slightly lower than 33 MHz increases due to the frequency of a noise component and an oscillation frequency slightly higher than 33 MHz decreases due to the frequency of the noise component. Accordingly, a frequency count value increases in the frequency slightly lower than 33 MHz and decreases in the frequency slightly higher than 33 MHz. Thus, the frequency count value is not changed in the entire range.

Figure 8:
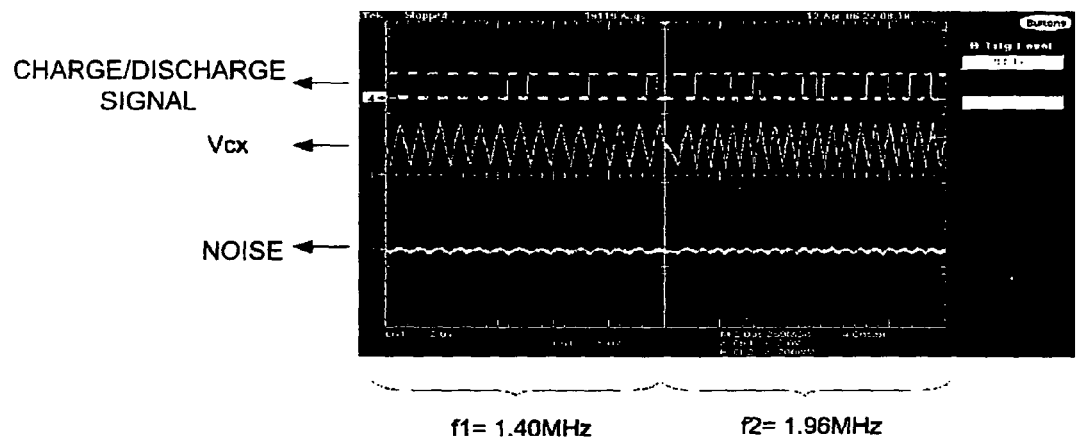
FIG. 8 illustrates an oscilloscopic waveform showing the influence of noise on an oscillation frequency.
Figure 8:
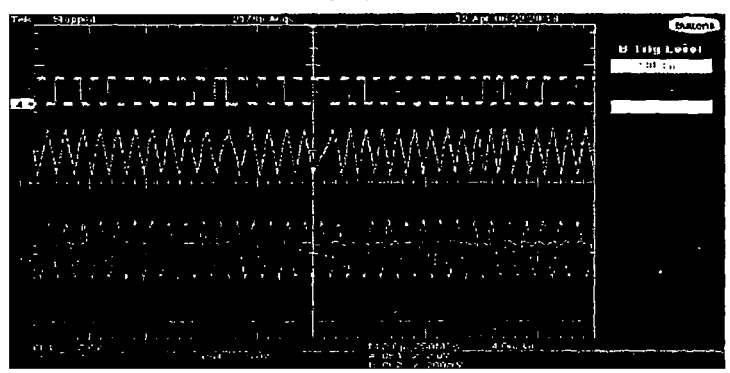

FIG. 8 illustrates an oscilloscopic waveform showing the influence of noise on an oscillation frequency. In particular, when there are two time division oscillation frequencies f1 (1.40 MHz) and f2 (1.96 MHz), FIG. 8a shows a case where noise is not applied and FIG. 8b shows a case where noise of 1.65 MHz is applied.

It can be seen that, during a period of 20 μs, the frequency count value, that is, the pulse number of a charge/discharge signal, which is a rectangular wave, is 32.4 in FIG. 8a and 32.3 in FIG. 8b. This is because the frequency count value increases in the oscillation frequency slightly lower than 1.65 MHz which is the frequency of the noise and decreases in the oscillation frequency slightly higher than 1.65 MHz and thus the frequency count value is not changed in the entire range.

Accordingly, when an oscillator outputs a plurality of time division frequencies according to capacitance detected by a capacitance detection plate and the plurality of time division frequencies are counted during a predetermined time period, the increasing and decreasing of the oscillation frequency due to the noise are offset and the count value of the entire count time becomes uniform.

When the noise frequency is not located at the central part of the oscillation frequency, the influence due to noise interference is not completely offset. Accordingly, it is preferable that the oscillation frequency is finely time-divided and the frequency count time is long. It is more preferable that the oscillation frequency has a wide band including an external noise band.

The oscillation frequency band cannot always have the noise frequency located at the central part thereof. In a case of using the conventional single frequency, the single frequency follows the noise frequency when the single frequency approaches the noise frequency. Accordingly, an error occurs due to a variation in single frequency. However, according to the present invention, even when the noise frequency is out of the oscillation frequency band, only the oscillation frequency close to the noise frequency is influenced by the noise frequency and thus an error of the oscillation frequency is as small as ignorable as compared with the case of the single frequency.

Figure 9:
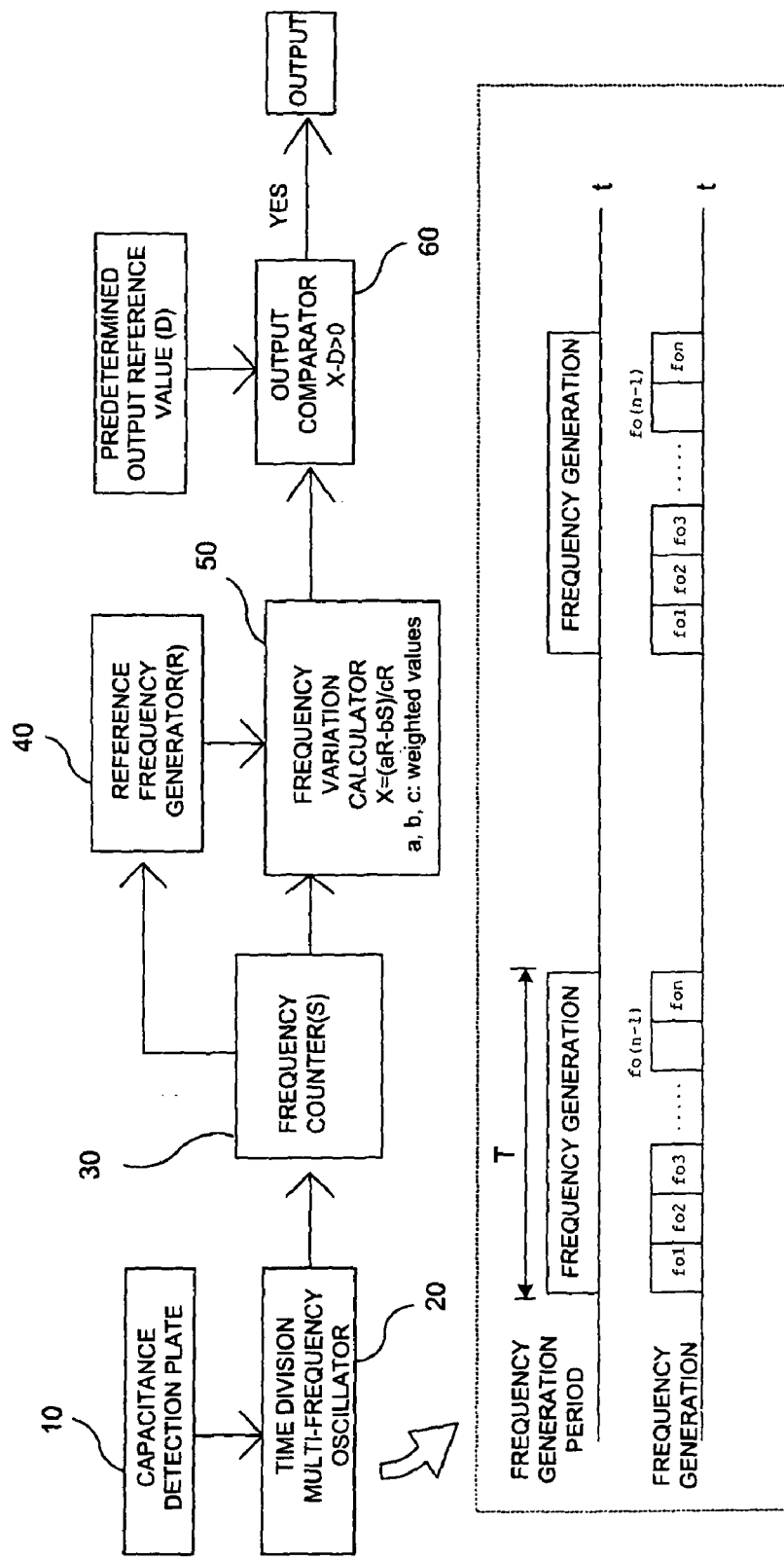
FIG. 9 is a view showing an apparatus for detecting capacitance according to an embodiment of the present invention.

FIG. 9 is a view showing an apparatus for detecting capacitance according to an embodiment of the present invention. When an object approaches a capacitance detection plate 10, a value of a capacitor Cx between the object and the detection plate 10 varies. An oscillator 20 outputs a plurality of time division oscillation frequencies fo1, fo2, fo3, . . . , fo(n−1) and fon according to the value of the capacitor. Here, n is two or more.

A frequency counter 30 counts the plurality of time division oscillation frequencies output from the oscillator 20 during a frequency generation period T. Although external noise interferes with the oscillation frequencies during the frequency generation period T, a frequency count value S does not vary, for a reason described with reference to FIGS. 7 and 8.

Figure 1:
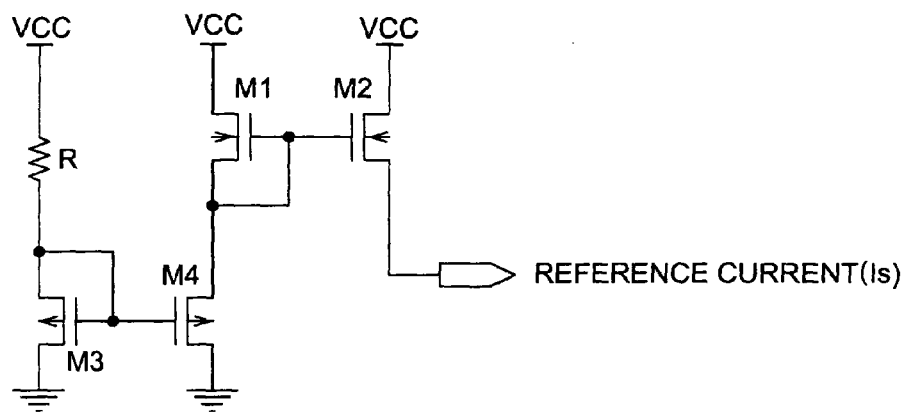
FIGS. 1 to 4 are views illustrating a conventional single triangle wave oscillator.
Figure 2:
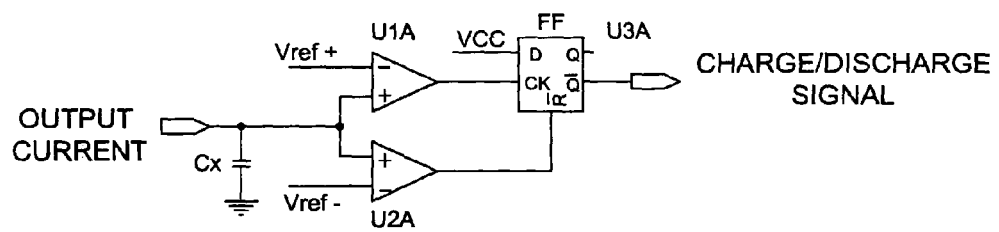
Figure 3:
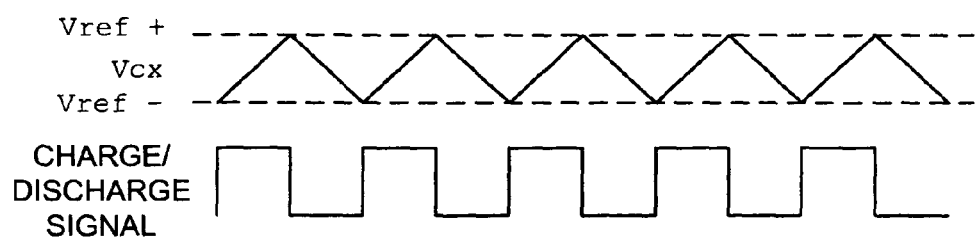

The plurality of time division oscillation frequencies fo1, fo2, fo3, . . . , fo(n−1) and fon can be obtained by controlling a transistor M2 or a resistor R shown in FIG. 1 and time-divisionally increasing or decreasing reference current Is. Alternatively, the plurality of time division oscillation frequencies can be obtained by controlling transistors M9 and M11 shown in FIG. 3.

Figure 10:
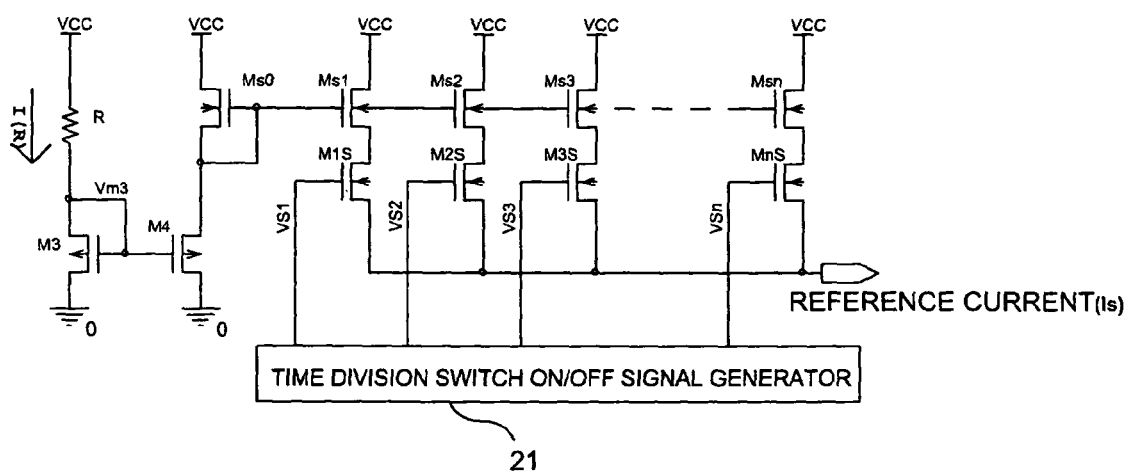
FIGS. 10 and 14 are views showing examples of an internal circuit for allowing a time division multi-frequency oscillator 20 shown in FIG. 9 to output a plurality of time division frequencies.
Figure 13:
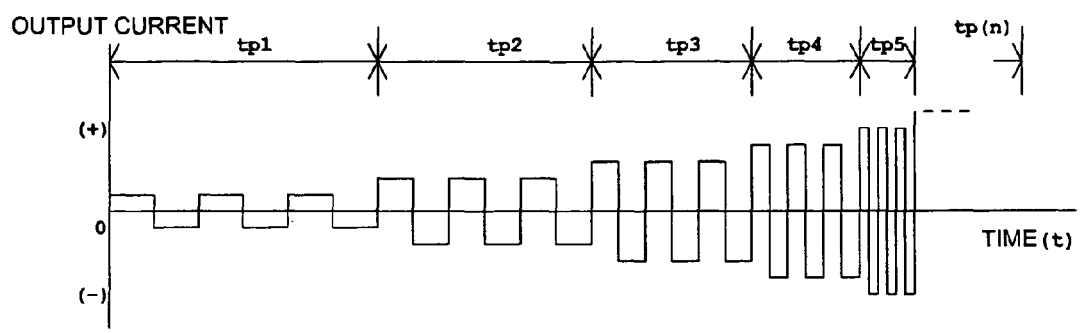
FIG. 13 is a view showing the waveform of output current which is generated in the time division multi-frequency oscillator 20 shown in FIG. 9 and applied to the capacitance detection plate 10.
Figure 14:
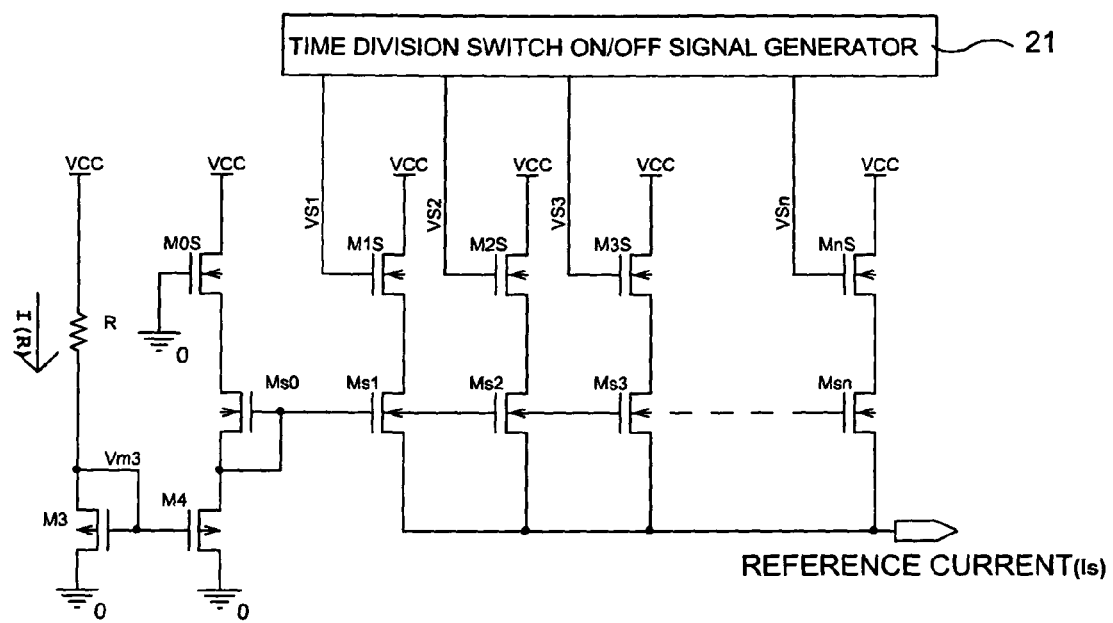

FIGS. 10 and 14 are views showing examples of an internal circuit for allowing the time division multi-frequency oscillator 20 shown in FIG. 9 to output the plurality of time division frequencies by controlling the transistor M2 shown in FIG. 1. FIG. 12a is a timing diagram of switch transistors MxS which are operated by a time division switch on/off signal generator 21 shown in FIG. 10 and FIG. 12b is a graph showing a variation in reference current Is according to the operation state shown in FIG. 12a. FIG. 13 is a view showing the waveform of output current which is generated in the time division multi-frequency oscillator 20 shown in FIG. 9 and applied to the capacitance detection plate 10.

Figure 4:
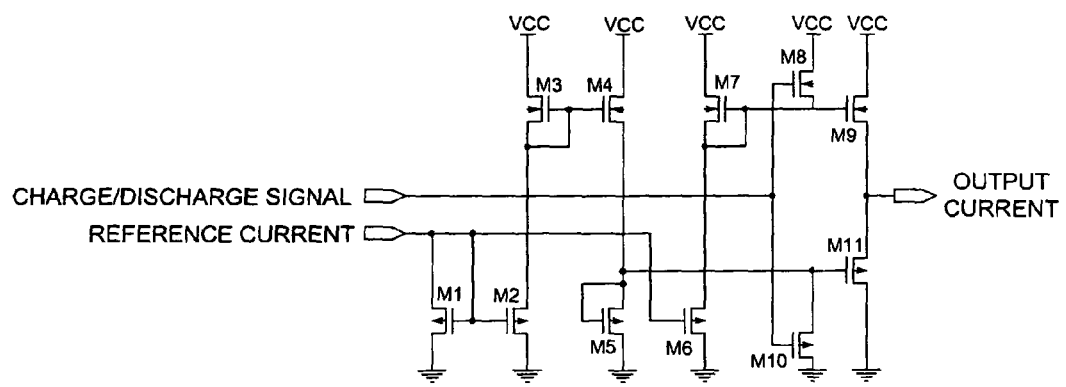
Figure 5:
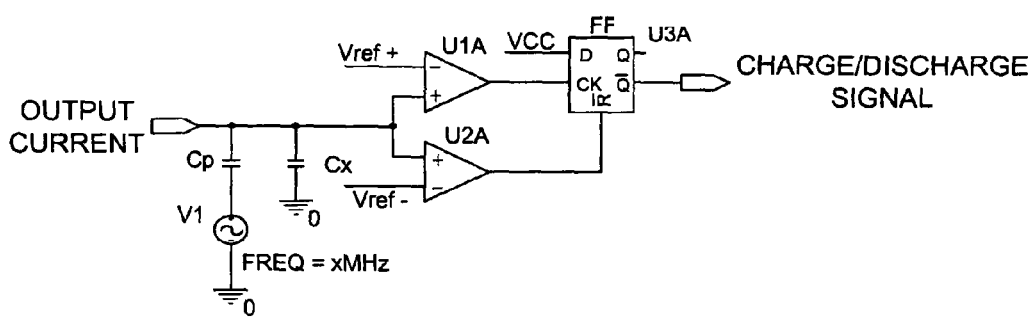
FIG. 5 is a view showing a model in which external noise Cp and V1 is applied to a capacitor Cx of a capacitance detection plate.
Figure 6:
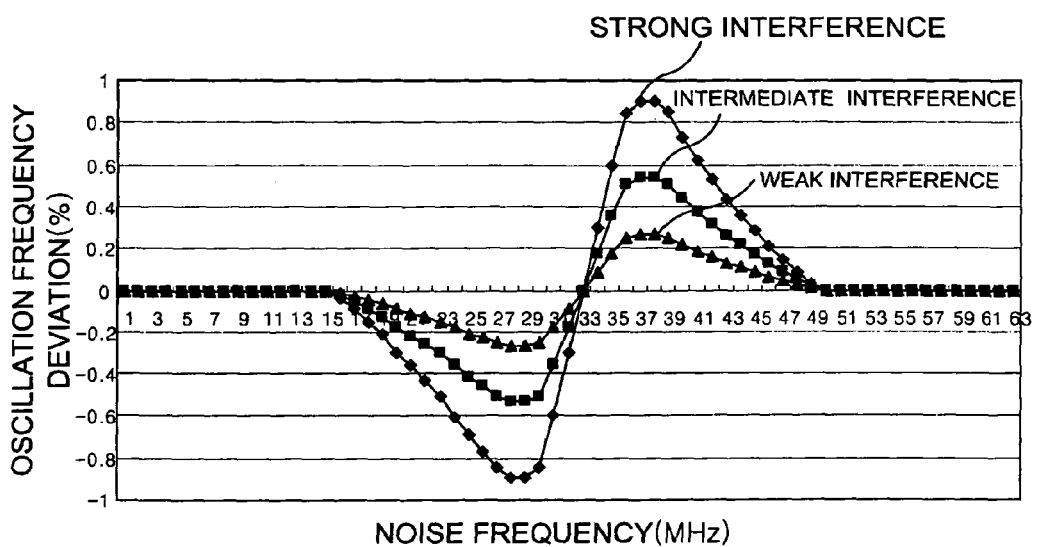
FIG. 6 is a graph showing a phenomenon that an oscillation frequency of the oscillator is distorted by the external noise Cp and V1.
Figure 12:
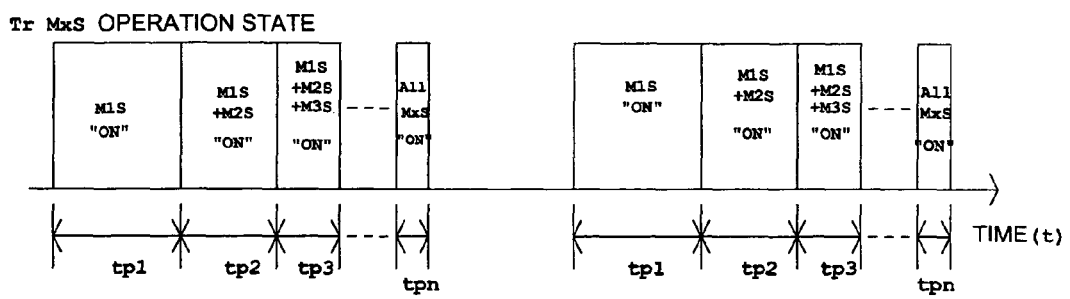
Figure 12:
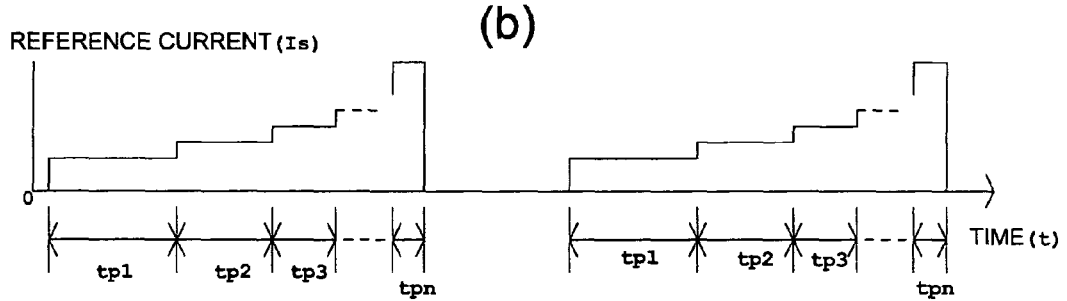

When the time division switch on/off signal generator 21 shown in FIG. 10 sequentially turns on the switch transistors M1S, M2S, M3S, . . . and MnS during periods tp1, tp2, tp3, . . . and tpn shown in FIG. 12, respectively, the reference current Is increases stepwise as shown in FIG. 12b. The reference current is input to the circuit shown in FIG. 4 to obtain output current in which charge current and discharge current alternately are generated as shown in FIG. 13 and thus the oscillation frequencies according to the capacitance of the capacitance detection plate 10 shown in FIG. 9 are generated.

As the reference current increases stepwise, the oscillation frequency increases stepwise. Accordingly, the plurality of oscillation frequencies corresponding to the increase of the reference current is generated. The plurality of oscillation frequencies is generated in a burst form (the frequency is not generated in a period between the periods tp1 to tpn and the next periods tp1 to tpn as shown in FIG. 12) so that power consumption of the circuit can be reduced. FIG. 14 shows an example that the transistors MxS can be switched even when a low voltage is applied, by locating the switch transistors MxS above current mirror elements Msx such that sources of the switch transistors MxS are connected to a power supply source Vcc.

Figure 11:
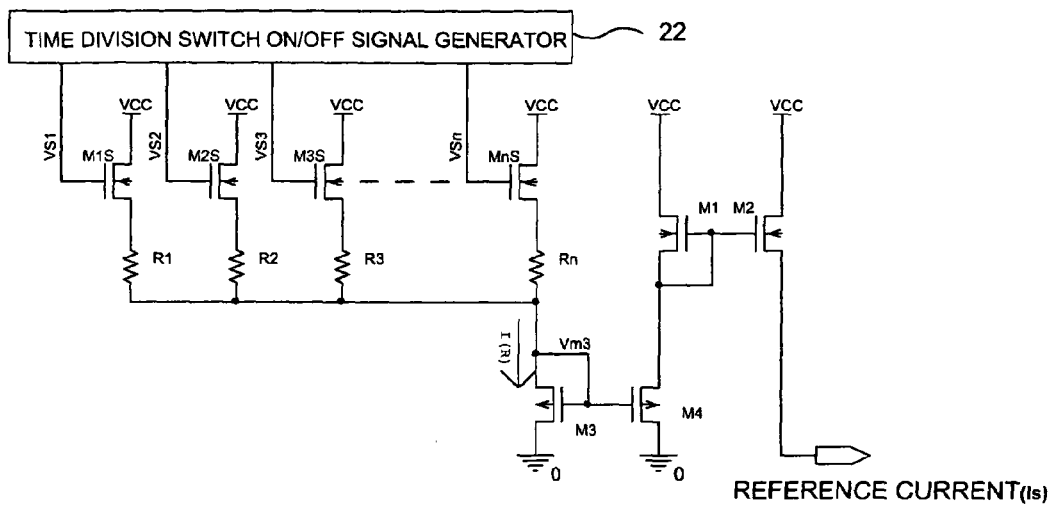
FIG. 11 is a view showing another example of an internal circuit for allowing the time division multi-frequency oscillator 20 shown in FIG. 9 to output a plurality of time division frequencies.

FIG. 11 is a view showing another example of an internal circuit for allowing the time division multi-frequency oscillator 20 shown in FIG. 9 to output a plurality of time division frequencies by controlling the resistor R shown in FIG. 1.

Similar to FIG. 10, when the switch transistors M1S, M2S, M3S, . . . and MnS are sequentially turned on according to signal (FIG. 12a) generated by the time division switch on/off signal generator 22, resistors R1, R2, R3, . . . , and Rn are connected in parallel and current I(R) which flows through resistors connected in parallel increases stepwise and thus the reference current shown in FIG. 12b is obtained.

Since the plurality of oscillation frequencies are generated and are counted by the frequency counter, the oscillation frequency generation period is an important parameter for determining the count value. When each of the plurality of oscillation frequencies is generated during a same period, the count value of the highest frequency fon is largest. Accordingly, the frequency fon is more influenced by the noise than the lowest frequency fo1.

In order to solve such a problem, it is preferable that the count values of the plurality of oscillation frequencies are equal or similar. For example, if a period for generating the frequency fo1 is tp1, a period for generating the frequency fo2 is tp2, . . . , and a period for generating the frequency fo(n) is tpn, tp1=tp2=tp3= . . . =tpn may be generally set. However, in order to reduce the influence of the noise, it is preferable that the period tp is adjusted such that (fo1*tp1)=(fo2*tp2)= . . . = (fon*tpn) is set to make the count values uniform. Alternatively, in order to avoid the complexity of the circuit, tp1>tp2> . . . >tp(n−1)>tpn may be set.

A reference frequency generator 40 generates a reference frequency R. In order to compensate temporal variations of the circuit and environment to prevent a detection error, it is preferable that the reference frequency R is sequentially updated at a speed lower than a variable speed of the capacitance Cx of the detection plate 10 or the reference frequency R is periodically updated stepwise such that the reference frequency R follows the count value S of the oscillation frequency input to the frequency counter 30. When the low temporal variation of the oscillation frequency is compensated by the reference frequency R and the variation in oscillation frequency having a speed of higher than the compensation speed of the reference frequency R is detected and output by an operation before being compensated by the reference frequency R. Accordingly, the variation in capacitance of the detection plate 10 is detected based on the compensation speed of the reference frequency R and the reference frequency R needs to be updated at the speed lower than that of the variation in capacitance to be detected by the detection plate 10.

A frequency variation calculator 50 calculates the frequency variation X by Equation $$X=(aR-bS)/cR$$

where, a, b and c are weighted values and are in a range of 0.001 to 10000. A comparator 60 compares the frequency variation X with a predetermined detection level D and outputs a detection signal when the frequency variation X is larger than the predetermined detection level D.

Although the preferred embodiments of the present invention have been disclosed, those skilled in the art will appreciate that various modifications, additions and substitutions are possible, without departing from the scope and spirit of the invention as disclosed in the accompanying claims.

What is claimed is:

1. A method for detecting capacitance, the method comprising:
    allowing an oscillator to output a plurality of time division oscillation frequencies according to the capacitance detected by a capacitance detection plate;
    counting the plurality of time division oscillation frequencies during a predetermined time period; and
    offsetting increasing and decreasing of the oscillation frequencies due to noise such that a count value becomes uniform over the predetermined time period, wherein when the plurality of time division oscillation frequencies fo1, fo2, . . . , fo(n−1) and fon satisfies a relationship of fo1<fo2< . . . <fo(n−1)<fon and a period for generating the frequency fo1 is tp1, a period for generating the frequency fo2 is tp2, . . . , and a period for generating the frequency fon is tpn, the oscillator oscillates such that tp1>tp2> . . . tp(n−1)>tpn is set.

2. The method according to claim 1, wherein the oscillator oscillates such that (fo1*tp1)=(fo2*tp2)= . . . =(fon*tpn) is set.

* * * * *